JOHN J. SEARLES
INVENTOR
BY
ATTORNEYS

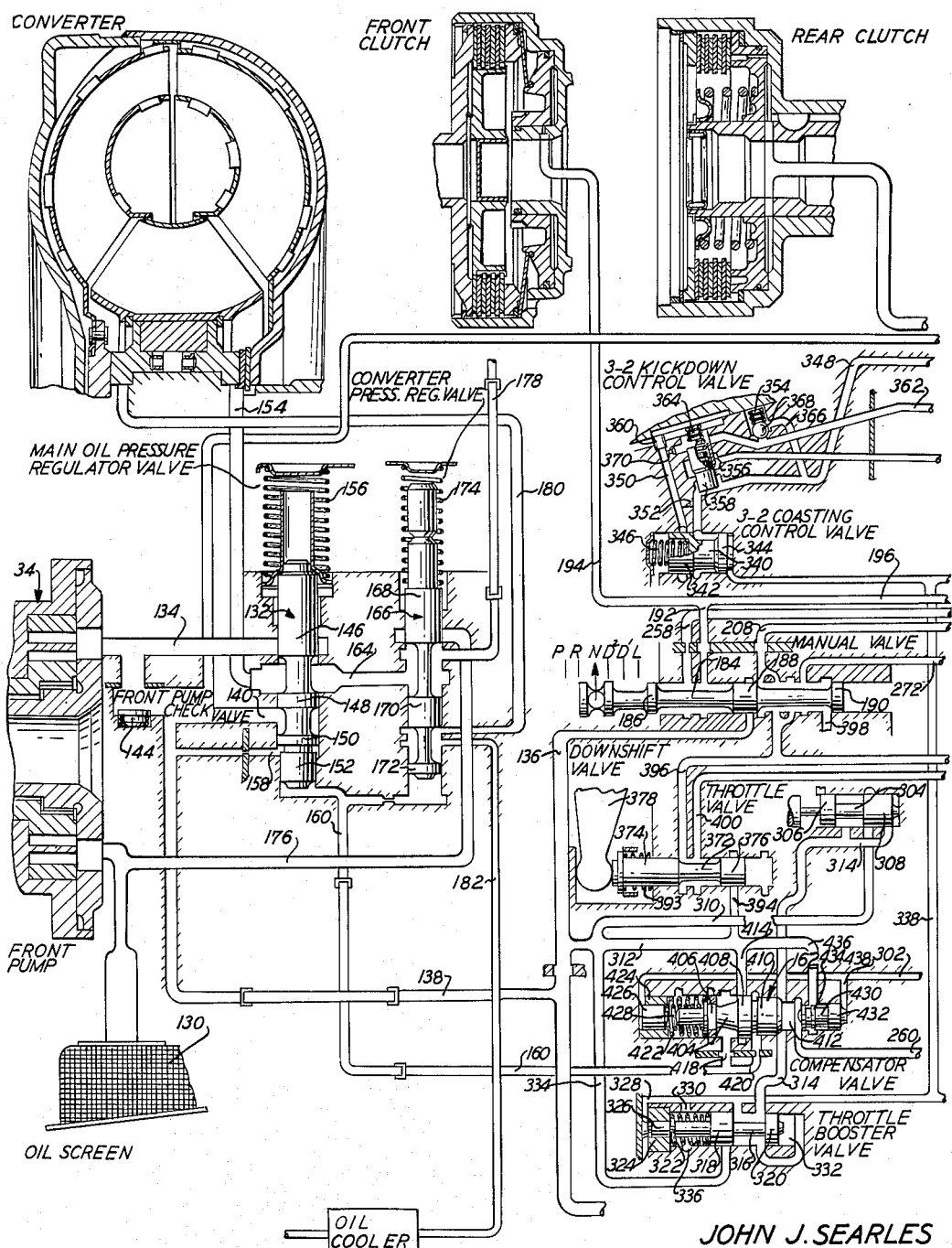

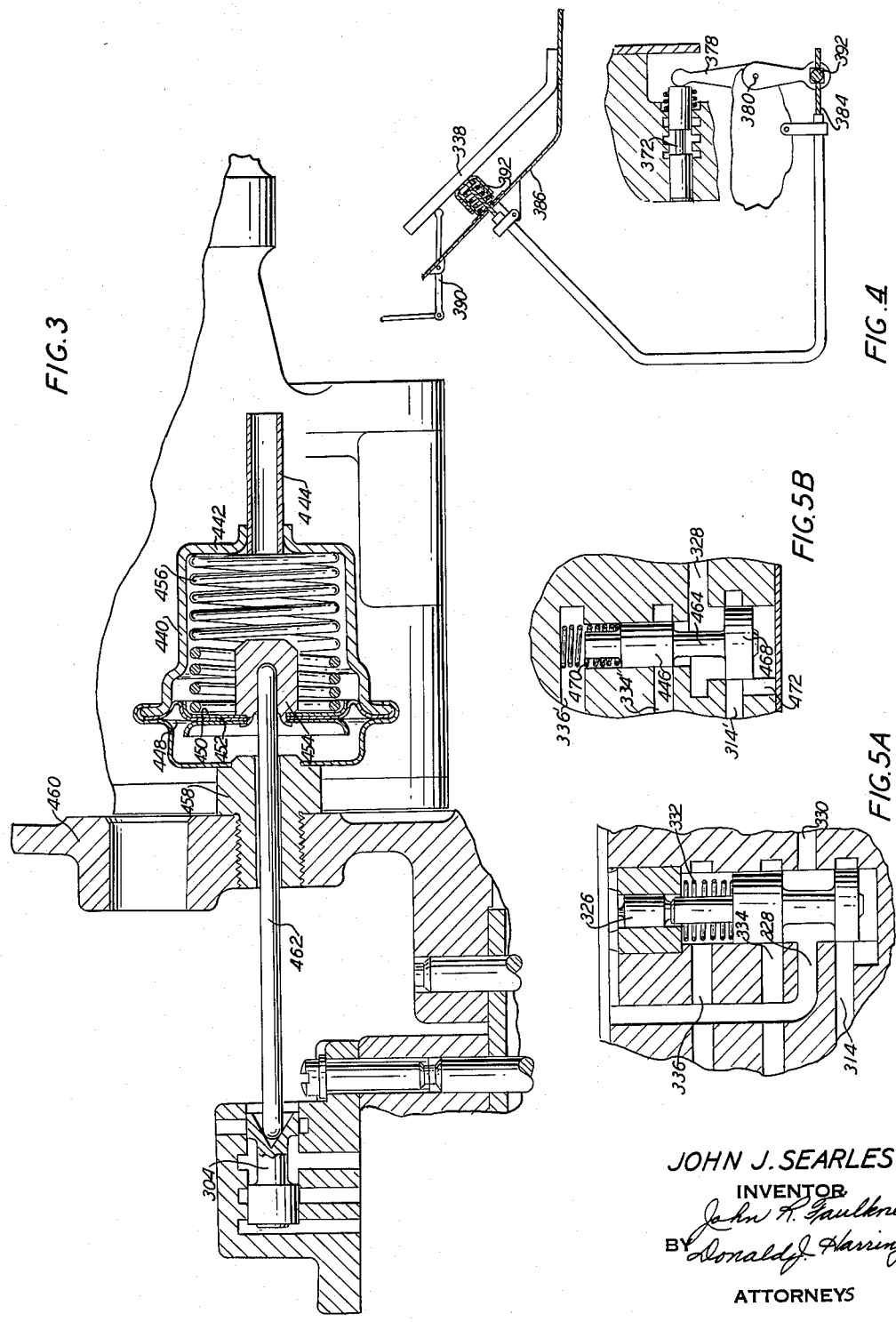

JOHN J SEARLES
INVENTOR

ନ୍ଧ3,258,984
RATIO SHIFT-POINT CONTROL SYSTEM FOR A
POWER TRANSMISSION MECHANISM
John James Searles, Garden City, Mich., assignor to Ford
Motor Company, Dearborn, Mich., a corporation of
Delaware
Filed Dec. 31, 1963, Ser. No. 334,742
9 Claims. (Cl. 74—472)

My invention relates generally to automatic control valve systems for multiple speed ratio power transmission mechanisms, and more particularly to a valve system for a power transmisison mechanism that is capable of controlling the timing of the operation of servo pressure operated clutch and brake servos that in turn are used to control the relative speeds of gear elements of a gear system that forms torque delivery paths between a driving member and a driven member.

The power transmission mechanisms to which the control system of my invention can be applied are adapted especially for use in automotive vehicle drivelines for delivering power from an internal combustion vehicle engine to the vehicle traction wheels. For a particular description of a transmisison structure and an automatic control valve system that is capable of embodying the improvements of my invention, reference may be made to the patent of James J. Duffy, No. 3,095,755, which is assigned to the assignee of my instant invention.

In a transmission arrangement of the type shown in the Duffy patent, a hydrokinetic torque converter unit is employed in combination with the elements of a compound planetary gear system with the turbine member of the torque converter unit being drivably coupled to a power input element of the gear system through a pressure engageable front clutch. A low speed ratio reaction brake means is employed for anchoring a first reaction member of the gear system during operation in the lowest speed ratio so that the driven member that is connected to a power output element of the gear system is subjected to a driving torque that is equal to the magnitude of the engine torque times the product of the hydrokinetic torque ratio of the converter unit and the mechanical torque ratio of the gear system. An intermediate speed ratio fluid pressure operated brake is employed for anchoring selectively a second element of the gear system to establish an intermediate driving speed ratio as the front clutch remains applied. That same gear element then can be clutched to the hydrokinetic turbine of the torque converter unit by a fluid pressure operated rear clutch as the intermediate speed ratio brake is released to establish direct drive operation. Reverse drive operation is achieved by releasing the front clutch and the intermediate speed ratio brake and by engaging the rear clutch while anchoring the first-mentioned reaction element of the gear system.

The intermediate speed ratio brake is applied and released by means of a double acting fluid pressure operated servo comprising a servo cylinder within which is positioned a brake applying piston, the piston and cylinder cooperating to define a pair of opposed working chambers. The intermediate speed ratio brake thus can be applied and released by selectively distributing pressure to the opposed sides of the piston.

It is conventional practice in an arrangement of the type disclosed in the Duffy patent to connect hydraulically the servo for the rear clutch and the brake release chamber of the intermediate speed ratio brake servo so that the intermediate speed ratio brake will become released as the rear clutch becomes applied during a so-called intermediate speed ratio to high speed ratio upshift. The pressure source for the servos is a positive displacement pump that is drivably connected to a torque delivery member of the mechanism, and conduit structure and an associated valve system are employed for distributing pressure from the pressure source to the servos. Pressure distribution is controlled by the valve system having appropriate shift valves that respond to a vehicle speed pressure signal and a signal that is proportional in magnitude to engine torque.

During acceleration from a standing start, an upshift from the lowest speed ratio to the intermediate speed ratio is obtained as the valve system distributes control pressure from the source to the brake apply chamber of the intermediate speed ratio brake servo. A subsequent upshift occurs as the acceleration period continues when the valve system allows control pressure to be distributed to the brake release chamber of the intermediate speed ratio brake servo and to the rear clutch. As soon as a sufficient pressure unbalance occurs across the piston of the intermediate speed ratio brake servo on such an upshift, the brake will become released. At this time, however, the rear clutch pressure will be of sufficient magnitude to cause partial engagement.

This mode of operation produces a certain degree of overlap between the application of the rear clutch and the release of the intermediate speed ratio brake so that a controlled amount of slipping of the friction elements will occur. This overlapping action is desirable on such a power delivery upshift since it establishes a positive shift point control and smooth ratio transition without sharp fluctuations in engine speed during the shift and without harsh inertia forces. Shift ratio control under coasting or zero torque delivery conditions, however, requires a modified degree of overlap in the operation of the rear clutch and the intermediate speed ratio brake since the friction elements of the clutch and brake then are not subjected to driving torque. A very reduced control pressure in the valve system then is sufficient to engage fully the rear clutch if a shift from the intermediate speed ratio to the high speed ratio occurs. There is a tendency, therefore, for the clutch to become fully engaged before the pressure differential in the apply and release chambers of the intermediate speed ratio brake servo is sufficient to disengage the intermediate speed ratio brake. This results in simultaneous application of the intermediate speed ratio brake and the high speed clutch on a so-called zero throttle upshift, and the vehicle operator thus experiences an undesirable harshness or lurching due to the resulting "tie-up" of the friction elements.

It is an object of my invention to overcome the problems described in the foregoing paragraph which are associated with a zero throttle upshift by providing a valve system that will alter the mode of operation of the intermediate speed ratio brake servo and the rear clutch during a zero throttle upshift so that it differs from the corresponding mode of operation during a torque delivery upshift thereby providing shift quality that is not apparent in conventional control systems.

I contemplate that my improved valve system will respond to the aforementioned engine torque signal and will alter the pressure distribution to the intermediate speed ratio brake servo as pressure begins to build up in the rear clutch upon a zero throttle upshift. The pressure that normally would exist in the brake apply chamber of the intermediate speed ratio brake servo becomes exhausted through the valve system in response to a pressure build-up in the rear clutch servo to a value that is sufficient to balance the clutch servo release spring that normally urges the clutch servo to a clutch release position. Thus, a pressure unbalance will occur across the piston of the intermediate speed ratio brake servo as soon as the rear clutch is conditioned for torque delivery. The overlap in the operation of the clutch and the brake, therefore, is avoided during such a zero throttle upshift.

The provision of a valve system that will accomplish this operating characteristic is an object of my invention.

It is a further object of my invention to provide a valve system of the type above set forth and which is characterized further by its ability to restore the original mode of operation of the intermediate speed ratio brake and the high speed clutch during a subsequent torque delivery upshift as the valve system responds to an increase in the engine torque sensitive pressure signal.

It is a further object of my invention to provide a valve system for a multiple speed ratio power transmission mechanism wherein the same valve elements of the valve system may be employed for establishing the desired timing in the operation of the clutch and the brake servos during zero throttle and part throttle upshifts as well as during advanced throttle upshifts under torque delivery conditions.

For the purpose of describing more particularly the improvements of my invention, reference will be made to the accompanying drawings, wherein:

FIGURES 2a and 2b show in schematic form a valve system embodying the improvements of my invention;

FIGURE 3 shows an engine manifold pressure operated throttle valve mechanism for use in the system of FIGURES 2a and 2b;

FIGURE 4 shows a downshift control valve that forms a part of the control system of FIGURES 2a and 2b;

FIGURES 5a and 5b show modifications of a so-called valve pressure booster valve mechanism capable of being used in the control system of FIGURES 2a and 2b.

Figure 1:
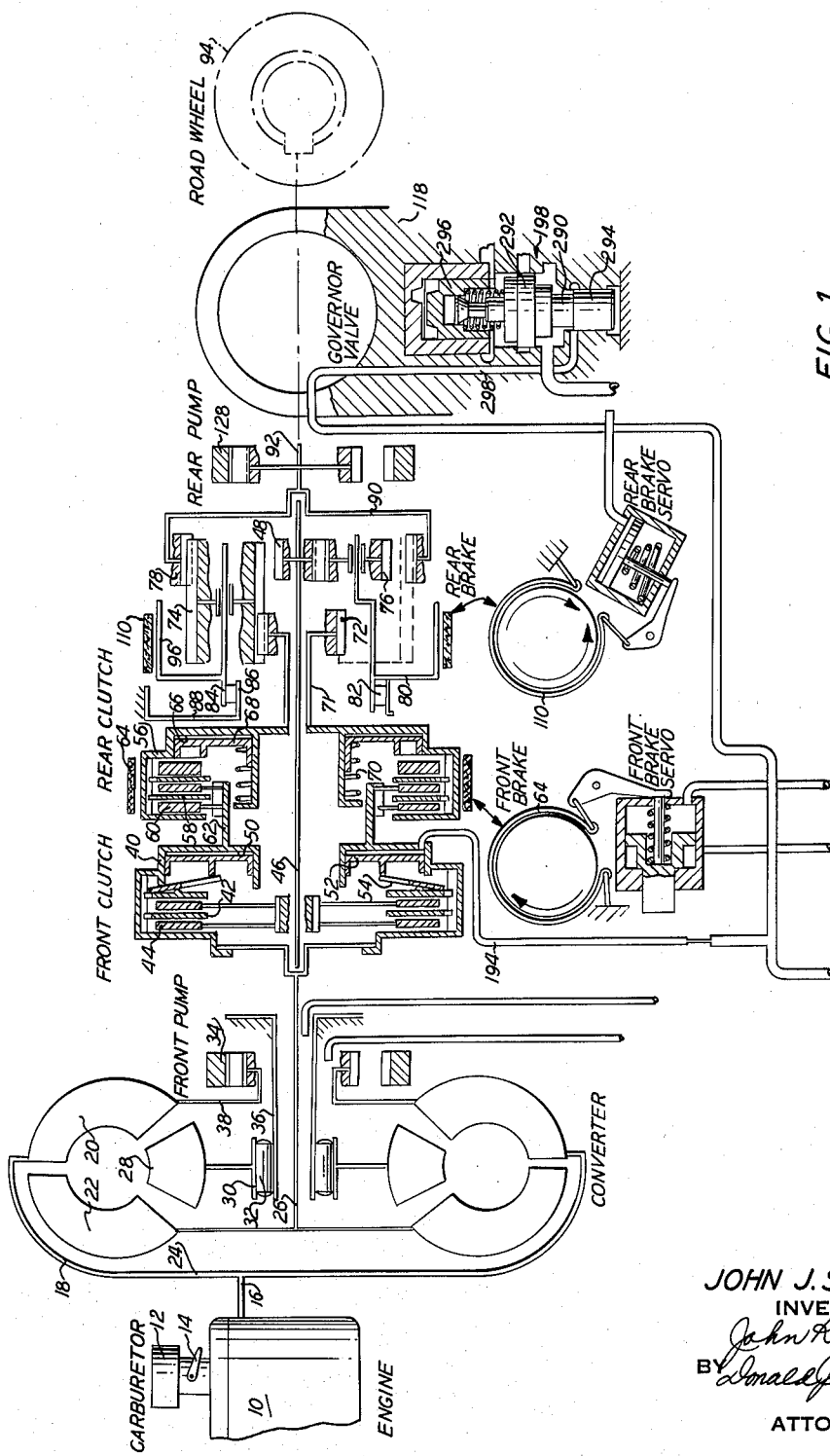
FIGURE 1 shows in schematic form a gear system capable of being used with my improved control system.

Referring first to FIGURE 1, numeral 10 designates an internal combustion vehicle engine having a fuel-air mixture intake manifold system with a carburetor 12 and an operator controlled carburetor throttle valve shown in part at 14. The engine crankshaft 16 of the engine 10 is connected drivably to a drive plate 18 which in turn is connected drivably to a bladed hydrokinetic torque converter impeller 20. This impeller is situated in toroidal fluid flow relationship with respect to the bladed turbine 22. The hub 24 of turbine 22 is drivably connected to a central turbine shaft 26.

A bladed stator 28 is disposed between a flow exit section of the turbine 22 and the flow entrance section of the impeller 20. It includes an overrunning brake outer race 30 that may be cammed to cooperate with overrunning brake rollers 32. A stationary stator sleeve shaft 36 supports an inner race for the rollers 32 so that the stator 28 is inhibited from rotation in a direction opposite to the direction of rotation of the impeller but capable of freewheeling in the direction of the impeller rotation during operation of the torque converter in the coupling range.

The stator sleeve shaft 36 may be secured to a relatively stationary portion of a transmission housing, not shown.

A positive displacement pump 34 is disposed in a conventional fashion in a portion of the housing structure and is connected drivably to a hub 38 of the impeller 20.

Turbine shaft 26 is connected to a compound clutch member 40 which defines an internally splined clutch drum. Externally splined friction clutch discs 42 are drivably carried by the clutch element 40 and are situated in interdigital relationship with respect to companion friction clutch discs 44. These in turn are drivably connected to a central torque delivery shaft 46 which is drivably connected to a planetary sun gear 48.

Clutch element 40 defines an annular piston 50 within which is slidably situated an annular piston 52. A Belleville disc spring 54 provides a force multiplying connection between piston 52 and the disc assembly shown at 42 and 44. When fluid pressure is admitted to the annular cavity defined by the piston 52 and the cylinder 50, the discs 42 and 44 are urged into frictional engagement thereby establishing a driving connection between shaft 26 and shaft 46. Fluid pressure is admitted to this chamber through a clutch servo feed passage 194.

A clutch and brake drum 56 is journaled for rotation about the shaft 46. It is internally splined to permit a driving connection with externally splined friction clutch disc 58. These are situated in interdigital relationship with companion friction clutch discs 60 carried by an extension 62 of the clutch element 40. A friction brake band 64 surrounds the drum 56 and may be applied and released by means of a double acting fluid pressure operated front brake servo that is identified in FIGURE 1 by an appropriate legend.

The drum 56 defines an annular cylinder 66 within which is positioned an annular piston 68. A clutch piston return spring 70 normally urges the piston 68 in a right-hand direction. When fluid pressure is admitted to the annular cavity defined by the cylinder 66 and the piston 68, the piston 68 urges the friction clutch discs 58 and 60 into frictional driving relationship thereby establishing a driving connection between shaft 26 and a sleeve shaft 71 to which the drum 56 is connected. Shaft 71 is connected also to a relatively large pitched diameter sun gear 72 which meshes with a set of long planet pinions 74. These pinions 74 in turn mesh with a set of short planet pinions 76. Pinions 76 drivably engage sun gear 48 and pinions 74 drivably engage planetary ring gear 78. The planet pinions 74 and 76 are journaled for rotation upon a common carrier 80 which in turn is journaled for rotation within the transmission housing, not shown.

An overrunning brake 82 inhibits rotation of the carrier in one direction but accommodates free-running motion thereof in the opposite. This brake includes an outer race 84 connected to the carrier 80 and an inner race 86. A suitable boss or separating wall 88 supports race 86 and is connected to the housing.

Ring gear 78 is connected to a power output member 90 which in turn is coupled to a power output shaft 92. This shaft is situated in driving relationship with respect to the vehicle road wheels shown schematically at 94, a suitable drive shaft and differential mechanism being provided for this purpose. A governor valve assembly, indicated generally by reference character 198, is connected to the shaft 92 and rotates in unison therewith. A positive displacement rear pump shown at 128 also is connected drivably to the shaft 92 and is adapted to develop pressure whenever shaft 92 rotates. Pump 128 and pump 34 form a part of the control valve system that will be described subsequently with reference to FIGURES 2a and 2b.

The carrier 80 defines a brake drum 96 about which is disposed a friction brake band 110. This brake can be applied and released by means of a servo as indicated in FIGURE 1 by an appropriate legend.

To establish low speed ratio operation it merely is necessary to engage the front clutch by introducing pressure into the cylinder 50. Engine torque then develops fluid circulation in the hydrokinetic torque converter mechanism so that turbine torque is developed by the turbine 22. The turbine torque is distributed through the front clutch to the sun gear 48. The overrunning brake 82 acts as a reaction member for the planetary gear system and the ring gear 78 is driven at a reduced speed relative to the speed of sun gear 48.

Figure 2B:
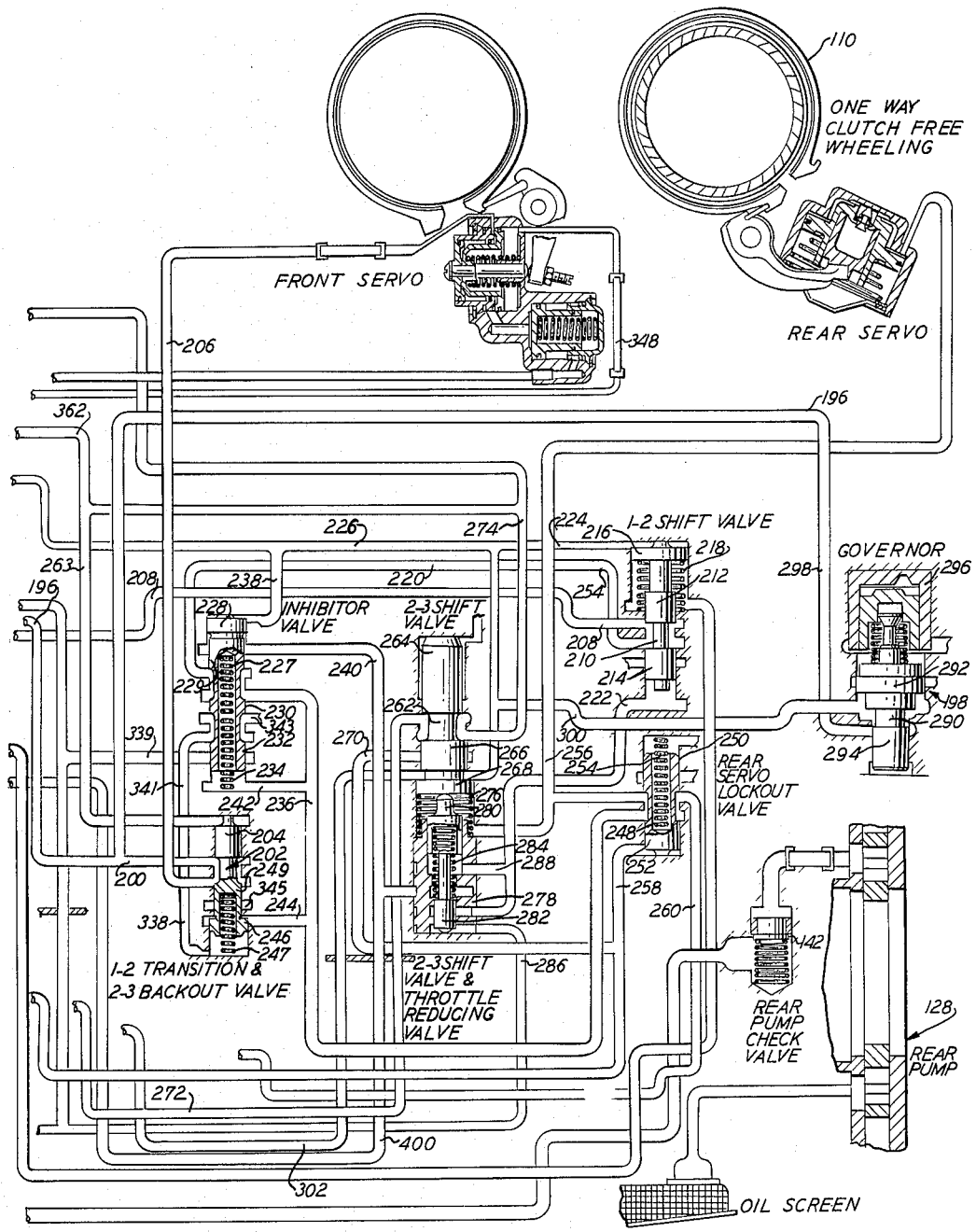

If it is desired to establish coast braking operation or continuous operation in the lowest speed ratio, provision is made in the control valve system of FIGURES 2a and 2b for applying friction brake band 110, which supplements the action of the overrunning brake 82. Brake 110 will prevent freewheeling motion of the carrier 80 and supplement the action of the overrunning brake 82 to provide torque reaction during operation in the lowest speed ratio.

To establish intermediate speed ratio operation the front clutch remains applied and the brake band 64 is applied, thus anchoring sun gear 72. Brake band 110 and the rear clutch are released. Sun gear 72 now functions as a reaction member for the gear system rather than the carrier 80, and the ring gear 78 then is driven at an increased speed ratio that is greater than the lowest speed ratio but less than unity.

An upshift to the high speed or direct drive ratio is obtained by releasing both brake bands and applying simultaneously both the front clutch and the rear clutch. The sun gears 48 and 72 thus become locked together to cause the elements of the gear system to rotate in unison. A direct connection then is established between shaft 26 and the shaft 92.

Referring next to FIGURES 2a and 2b, the front and rear clutches and the front and rear brakes are identified by appropriate legends. The front pump 34 and the rear pump 128 are supplied with low pressure fluid from a common oil sump identified by reference character 130. The discharge side of front pump 34 communicates with a pressure regulator valve 132 through a control pressure passage 134. The discharge side of the tail shaft driven rear pump 128 communicates with regulator valve 132 through control pressure passages 136 and 138 and through branch passage 140. A one-way check valve 142 is situated in passage 136, as indicated, to accommodate a transfer of fluid from pump 128 to regulator valve 132 while inhibiting a reverse flow. In a similar fashion a one-way check valve 144 is disposed on the discharge side of pump 34 between passages 134 and 140. If it is assumed that the discharge pressure from pump 34 is greater than the discharge pressure for the tail shaft driven rear pump 128, check valves 142 and 144 will respectively assume a closed position and an open position as indicated in FIGURES 2a and 2b. This condition normally exists during forward driving operation in the first or second transmission speed ratio. The control pressure requirements of the circuit are, therefore, supplied by the pump 34.

Regulator valve 132 comprises a valve spool having spaced valve lands 146, 148, 150 and 152 which cooperate with internal valve lands formed in the valve cavity within which the valve spool is situated. Control pressure passage 134 communicates with a converter pressure supply passage 154 through a regulator valve chamber and the degree of communication between these passages is regulated by valve land 146. The regulator valve spool is biased in a downward direction, as seen in FIGURE 2a, by a regulator valve spring 156, and the spring biasing force is opposed by a hydraulic pressure force acting on a differential area defined by adjacent valve lands 150 and 152. Low pressure is supplied to this low pressure area by a branch passage 158. It is apparent that the regulator valve will function to regulate the magnitude of the pressure level existing in passages 134, 140, 138 and 136.

The force of spring 156 is opposed also by a compensator pressure force acting on the lower end of the regulator valve spool, and this compensator pressure is supplied to the lower end of the regulator valve chamber through a compensator pressure passage 160 that in turn extends to a compensator valve generally identified by reference character 162. This compensator valve subsequently will be described briefly.

Passage 154 communicates with passage 164 through the valve chamber and this passage is defined in part by spaced valve lands 146 and 148. Passage 164 extends to a converter pressure regulator valve past a movable valve spool 166 having spaced valve lands 168, 170 and 172. Passage 164 communicates with the valve chamber occupied by the converter pressure regulator valve spool between valve lands 168 and 170 as indicated. The diameter of valve land 168 is greater than the diameter of valve land 170, and a valve biasing force due to the pressure in passage 164 therefore acts on the converter pressure regulator valve spool to urge the same in an upward direction as shown in FIGURE 2a. This pressure force is opposed and balanced by a converter pressure regulator valve spring 174. A low pressure sump passage 176 communicates with the valve chamber of the converter regulator valve spool and the valve land 168 controls the pressure distribution between passages 178 and 176, the latter extending to the sump 130. It is apparent from the foregoing that the converter pressure regulator valve will control the magnitude of the pressure level existing in passages 154 and 164 at a calibrated operating level. This same valve functions to control the magnitude of the lubricating oil pressure which is supplied to lubricating oil passage 178, the latter communicating with passage 164 through the space defined by valve lands 168 and 170.

The converter pressure regulator valve is subjected also to a compensator pressure force and compensator pressure is supplied to the lower end of the converter pressure regulator valve chamber for this purpose. The compensator pressure forces acting on the control pressure regulator valve and the converter pressure regulator valve influence the regulated pressure of each, and the magnitude of the compensator pressure can be controlled in a manner subsequently to be described in order to produce the desired regulating characteristics for each of these regulator valves.

The low pressure side of the torque converter circuit is connected to a converter fluid return passage 180 which communicates with the converter pressure regulator valve chamber at a location adjacent valve land 170. Similarly, an exhaust passage 182 communicates with the converter pressure regulator valve chamber at a location intermediate valve lands 170 and 172, and when the converter pressure regulator valve spool 166 assumes a downward position, the valve land 170 blocks passage 178.

When the vehicle engine first begins to operate, after the initial firing, the pump 34 will immediately begin to operate. Prior to this time, both of the regulator valves assume downward positions and the initial pressure produced by the pump 34 causes the control pressure regulator valve spool to move in an upward direction until it begins to regulate at the desired operating level. At this instant converter fluid is made available to the converter and when the pressure requirements of the converter are satisfied, the converter pressure regulator valve will then begin to function. When the converter pressure reaches the desired level, the lubricating oil passage 178 is uncovered by valve land 168 and the lubricating oil pressure requirements of the transmission are therefore satisfied. Upon a further increase in the magnitude of the converter pressure, valve land 170 will uncover the converter fluid in passage 180, thereby completing the fluid circuit through the torque converter. An oil cooler is provided, as indicated, in exhaust passage 182 for the purpose of dissipating the energy absorbed by the hydrokinetic fluid.

If the driving conditions are such that the discharge pressure of pump 128 is greater than the discharge pressure for pump 34, check valve 144 will close and check valve 142 will open. Control pressure, therefore, will be supplied to passages 136, 138 and 140 by the rear pump 128. In this instance the degree of communication between passages 140 and 164 is controlled by valve land 148, and the regulator valve spool 132 will assume a new balanced position in order to permit this regulation to take place. When this new balanced position has been assumed, passages 134 and 164 communicate freely since valve land 146 is no longer capable of functioning to regulate pressure. The pressure head for the pump 34 thereby is reduced and the horsepower loss caused by the pump 34 thus is reduced to a minimum. A manual valve is shown in FIGURE 2a and it comprises a valve spool generally designated by reference character 184. This valve spool may be moved within its cooperating valve chamber by means of a driver controlled gear shift lever or some other suitable transmission range selector mechanism. During operation of the vehicle the manual valve may be moved to any one of six positions which are separately identified in FIGURE 2a by letters P, R, N, $D^2$, $D^1$ and L which respectively correspond to park, reverse, neutral, secondary drive range, primary drive range and low drive range. The position of the manual valve selected by the vehicle operator determines the operating drive range for the transmission.

The valve spool 184 includes three valve lands identifed by reference characters 186, 188 and 190. Control pressure is distributed to the manual valve chamber through passage 136, and when the valve spool 184 assumes neutral position, which is indicated in FIGURE 2a, valve land 188 blocks the passage 136 thereby preventing distribution of fluid pressure to the various pressure operating elements of the circuit.

If it is assumed that valve spool 184 is moved from the neutral position shown to the primary drive range position $D^1$, control pressure will be distributed from passage 136 through the valve chamber to a passage 192 that in turn communicates with a passage 194 extending to the front clutch servo. The front clutch therefore is applied. Passage 192 also communicates with a passage 196 that extends to a hydraulic governor mechanism generally identified by reference character 198. Passage 196 also communicates with passage 200 extending to a 1-2 transition and 2-3 backout valve 202 having a valve land 204 which controls communication between passage 200 and a passage 206 extending to the apply side of a double acting front brake servo. This valve 202 is sometimes referred to hereinafter as a fluid pressure distributor valve means. When the valve 202 assumes a downward position, passage 206 communicates with an exhaust port 345 located in the transition valve chamber adjacent valve land 249. When the transition valve spool assumes an upward position, control pressure passes through the transition valve chamber from passage 200 to passage 206 thereby causing the front servo to apply brake 64.

Control pressure is also distributed through the manual valve from passage 136 to a passage 208 which in turn extends to a 1-2 shift valve as indicated. The 1-2 shift valve includes a valve spool 210 reciprocally mounted within a cooperating valve chamber. Spool 210 includes valve lands 212, 214 and 216. It is urged in an upward direction, as viewed in 2b, by a shift valve spring 218 acting between the valve body and the valve land 216, the latter being relatively large in diameter in comparison to valve lands 212 and 214. When the 1-2 shift valve spool 210 assumes the upward position shown in 2b, communication is established between passage 208 and a passage 220 extending to the inhibitor valve. However, when the 1-2 shift valve spool 210 assumes a downward position, passage 220 exhausts through the port located in the 1-2 shift valve chamber adjacent valve land 214, and passage 208 is blocked by land 212.

The lower end of the shift valve spool is subjected to a torque demand sensitive control signal which is supplied through passage 222, said signal establishing a fluid pressure valve actuating force which urges the 1-2 shift valve spool 210 in an upward direction to oppose the biasing action of spring 218. The upper end of the 1-2 shift valve chamber is supplied with a vehicle speed pressure signal through a governor pressure passage 224 which in turn communicates with a governor pressure passage 226 extending to the aforementioned governor 198.

The inhibitor valve comprises a multiple land valve spool 227 having spaced valve lands 228, 229, 230 and 232. Valve spool 227 is urged in an upward direction by a valve spring 234, and when it assumes the position shown in FIGURE 2b, communication is established between passage 220 and a passage 236, the former communicating with the latter through a portion of the inhibitor valve chamber between lands 228 and 230. When the inhibitor valve spool 227 assumes a downward position, passage 220 is blocked by land 229 and passage 236 is exhausted through the exhaust port in the inhibitor valve chamber adjacent valve land 230. Governor pressure passage 226 distributes governor pressure to the upper end of the inhibitor valve chamber through a branch passage 238 and this governor pressure urges the inhibitor valve spool in a downward direction against the opposing force of valve spring 234. A torque demand downshift pressure signal is transmitted to the upper end of the inhibitor valve chamber through a throttle pressure passage 240, and this signal is caused to act on the differential area defined by adjacent valve lands 228 and 229, thereby urging the inhibitor valve spool 227 in an upward direction. The lowermost end of the valve spool 226 is subjected to the control pressure in passage 236, and a branch passage 242 is provided for this purpose. This same pressure is distributed to the lower end of the transition valve chamber through a branch passage 244. This pressure acts on an auxiliary area on the upper side of a relatively large diameter valve land 246 of the transition valve, thereby causing the transition valve to assume initially a downward position whenever passage 236 is pressurized. This takes place whenever the inhibitor valve assumes an upward position, as seen in FIGURE 2b.

The inhibitor valve is urged downwardly against the opposing influence of spring 234 as the governor pressure in passage 238 increases to a predetermined value. Once a 1-2 upshift has occurred it is impossible to obtain subsequently a downshift into the lower speed ratio as long as the inhibitor valve is retained in its downward position.

At a time prior to the 1-2 upshift, however, passage 220 is pressurized and its pressure is distributed through the inhibitor valve to passage 242 thus locking the inhibitor valve in the upward poistion shown in FIGURE 2b. But upon movement of the 1-2 shift valve to the upshift position, passage 220 becomes exhausted through the exhaust port in the 1-2 shift valve thereby relieving the pressure in passage 242.

The inhibitor valve includes an exhaust port 343 situated between valve lands 230 and 232. This exhaust port 343 is in communication with a passage 341 when the inhibitor valve assumes the position shown in FIGURE 2b. If the inhibitor valve assumes a downward position, however, the exhaust port 343 is brought into communication with passage 236 by the lands 230 and 229 and passage 341 is brought into communication with a throttle pressure passage 339 by the lands 230 and 232. Passage 339 communicates with throttle pressure passage 197 and receives throttle pressure from the throttle valve and booster valve system subsequently to be described.

The pressure in passage 341 is distributed to the lower end of the 1-2 transition and 2-3 backout valve 202 and acts upon the lower surface of valve land 246 to assist in the action of spring 247. When the valve 202 assumes the position shown, an exhaust port 345 is blocked by land 249 and communication is established between passage 206 and passage 200, the latter receiving regulated control pressure from the manual valve. If the valve 202 assumes a downward position, however, passage 200 is blocked by land 204 and communication is established between passage 206 and the exhaust port 345.

Passage 236 extends to the rear servo lockout valve, and this valve includes a valve spool 248 having a pair of spaced valve lands 250 and 252. Valve spool 248 is urged in a downward direction by a lockout valve spring 254 and when valve spool 248 assumes a downward position, as seen in FIGURE 2b, passage 236 communicates with a passage 256 through the lockout valve chamber. Passage 256 in turn extends to the rear servo which is used for energizing brake 110. When valve spool 248 assumes an upward position, valve land 252 blocks passage 236 and causes passage 256 to communicate directly with the exhust port associated with the lockout valve, said exhaust valve being uncovered by valve land 250.

The lower end of the rear servo lockout valve chamber communicates with a passage 258, and whenever passage 258 is pressurized a fluid pressure force acts on the lower end of the rear servo lockout valve spool 248 to urge the same in an upward direction against the opposing force of spring 254. Passage 258 communicates directly with the manual valve chamber and when the manual valve spool is shifted to the $D^1$ position passage 258 is connected to control pressure passage 136 through the manual valve chamber. In this instance manual valve 188 uncovers passage 136 and valve land 186 blocks the exhaust passageway through the end of the manual valve chamber. On the other hand, when the manual valve spool is shifted to the neutral, reverse or park positions, passage 258 is exhausted through the end of the manual valve chamber and the rear servo lockout valve spring 248 will assume a downward position as illustrated in FIGURE 2b. It should also be noted that when the manual valve spool is shifted to the L position, valve land 186 will be shifted to the right hand side of passage 258, thereby causing passage 258 to be exhausted through the end of the manual valve chamber. The rear servo lockout valve will also assume a downward position in this instance.

When control pressure passage 136 is uncovered by valve land 188 as has been described, passage 192 extending to the front clutch is also pressurized since passage 192 then communicates with pressure passage 136 through the annular space defined in part by spaced valve lands 186 and 184. However, it is emphasized that valve land 186 will be situated on the left side of passage 192 when the manual valve spool assumes the L position, and the front clutch will therefore be pressurized whenever the manual valve spool assumes the $D^2$ position, the $D^1$ position or the L position. The front clutch is, however, exhausted through passages 194 and 192 and through the end of the manual valve chamber whenever the manual valve spool assumes the N, R or P positions.

When the rear servo lockout valve 248 assumes the downward position shown in 2b, passage 236 is brought in direct communication with a passage 260 extending to the compensator valve. One portion of the compensator valve is thus pressurized with control pressure for a purpose subsequent to be described.

A 2–3 shift valve is used for controlling the transition from second gear ratio to third gear ratio, and vice versa. This valve includes a shift valve spool 262 having valve lands 264, 266 and 268, the diameter of valve land 268 being greater than the diameter of valve land 266. Control pressure is distributed to the 2–3 shift valve chamber through a branch passage 270 communicating with control pressure passage 258, and when the shift valve spool assumes the upward position shown in FIGURE 2b, passage 270 is blocked by valve land 266. A passage 272 also extends to the 2–3 shift valve chamber at a location spaced from passage 270 and this passage 272 communicates with the manual valve chamber at a location between valve lands 188 and 190. When the manual valve spool assumes the N, $D^2$, $D^1$ or L positions, passage 272 communicates with an exhaust port in the manual valve chamber, but when the manual valve spool is shift to the R position, valve land 190 on the manual valve spool covers the exhaust port and valve land 188 uncovers control pressure passage 136 to provide direct communication between control pressure passage 136 and passage 272. When the manual valve spool is in the R position, passage 272 is pressurized and control pressure is thus distributed through the annular space defined in part by the valve lands 264 and 266 to a passage 274 extending to the pressure operated rear clutch servo. If the manual valve spool is shifted to any of the other positions, the rear clutch servo is exhausted through passage 274, through the 2–3 shift valve, through passage 272 and through the exhaust port formed in the manual valve chamber.

If the 2–3 shift valve spool is moved in a downward direction, valve land 266 uncovers passage 270 and valve land 264 blocks passage 272. The passage 270 is thus brought into communication with passage 274 to cause the rear clutch to become pressurized and engaged. The 2–3 shift valve spool 262 is urged in an upward direction by a valve spring 276 which is seated on a ported valve insert 278 located in the end of the shift valve chamber. The insert 278 is internally bored to receive a piston element 280 which acts directly on a shift valve spool. A throttle modulator valve plug 282 is also received within the bore of insert 278 and it is urged in a downward direction by a valve spring 284 situated between valve plug 282 and element 280.

A torque demand sensitive pressure signal is supplied to the lower end of the shift valve chamber through a passage 286, and this signal acts on the lower end of the throttle pressure modulator plug 282 to urge the same in an upward direction against the opposing force of spring 284. When the modulator throttle pressure exceeds a predetermined valve, plug 282 uncovers the aforementioned passage 222 thereby causing this passage 222 to be pressurized with a reduced or modulated throttle pressure. This modulated throttle pressure acts on the lower end of valve element 280 to urge this element and the shift valve spool in an upward direction, a suitable branch passage 288 being provided for this purpose. Passage 256 communicates with the region of the 2–3 shift valve chamber occupied by valve spring 276, thereby causing the 2–3 shift valve to assume an upward position whenever passage 256 and the rear servo are pressurized. This disables the 2–3 shift valve and prevents an automatic upshift.

The governor, shown at 198, includes a valve element 290 having spaced valve lands 292 and 294. This valve is disposed on one side of the axis of rotation of shaft 118 and is urged in an outward direction under the combined influence of the centrifugal force of a valve weight 296 and the weight of the valve element itself. Means are provided for canceling the centrifugal influence of the weight at high speeds of rotation of the shaft 118, thereby providing a different speed-pressure characteristic at high speeds than at lower speeds.

A control pressure passage 298 communicates with the governor valve chamber and it extends to the aforementioned control pressure passage 196. Valve land 294 controls the degree of communication between passage 298 and the aforementioned passage 226. The pressure in passage 226 is therefore a function of the speed of rotation of the shaft 118. The pressure in passage 226, hereinafter referred to as governor pressure, acts on the differential area defined by valve lands 292 and 294 to oppose the centrifugal valve operating forces.

Governor pressure is distributed through passage 226 to passages 224 and 238 as previously indicated, and this pressure acts on valve land 216 of the 1–2 shift valve to urge valve spool 210 in a downward direction. This same governor pressure is distributed to the 2–3 shift valve and acts on the differential area defined by lands 266 and 268 to urge the valve spool 262 in a downward direction. A branch passage 300 interconnects passage 226 and the 2–3 shift valve chamber for this purpose.

Branch passage 300 also communicates with a passage 302 which extends to the compensator valve as indicated. The manner in which the governor pressure influences the operation of the compensator valve will subsequently be explained.

The engine torque output pressure signal is produced by the throttle valve which comprises a valve spool 304 having a pair of valve lands 306 and 308. Valve spool 304 is slidably received within a cooperating valve opening, and it may be actuated by means of an engine manifold pressure operated servo mechanism which will be particularly described with reference to FIGURE 3. Control pressure is distributed to the throttle valve chamber through a passage 310 communicating with a branch passage 312 which in turn is connected to the control pressure passage 136. When the throttle valve spool 302 is moved in a left-hand direction, as viewed in FIGURE 2a, passage 312 is blocked by valve land 308, and similarly, an exhaust port in the throttle valve chamber is controlled by valve land 306. A throttle pressure passage 314 communicates with the throttle valve chamber at a position intermediate valve lands 306 and 308 and the throttle pressure in passage 314 is distributed to the right hand end of the throttle valve chamber so that it may act on valve land 308 to urge the valve spool 304 in a left-hand direction, as viewed in FIGURE 2a. The throttle pressure force acting on valve spool 304 opposes the valve actuating force of the aforementioned manifold pressure operated servo.

When the engine torque demand is increased upon movement of the engine carburetor throttle toward a wide open throttle position, the engine manifold pressure increases and this results in an increase in the valve operating force tending to urge valve spool 304 in a right-hand direction. This causes valve land 308 to uncover progressively passage 310 while simultaneously causing valve land 306 to restrict progressively the valve ports. This results in an increase in throttle pressure in passage 314. Conversely, when the engine torque output decreases upon a decrease in the engine carburetor throttle setting, valve spool 304 is urged in a left-hand direction, as viewed in FIGURE 2a, thereby progressively restricting passage 310 and simultaneously progressively opening the exhaust port. This results in a corresponding decrease in the magnitude of the throttle pressure in passage 314. Passage 314 extends past the compensator valve to a throttle booster valve which comprises a valve spool 316 having a pair of spaced valve lands 318 and 320 and the aforementioned passage 314 intersects the valve chamber intermediate these valve lands. Valve spool 316 is urged in a right-hand direction, as viewed in FIGURE 2a, by valve spring 322 which is seated on a sleeve insert 324. Valve plug 326 is disposed within the sleeve insert 324 and a passage communicates with the left-hand end of the booster valve chamber for the purpose of distributing throttle pressure to the left-hand end of the valve plug 326.

Passage 314 communicates with passage 328 through the annular space defined in part by the spaced valve lands 318 and 320 and by a branch passage 330. The pressure which exists in the annular space between valve lands 318 and 320 is distributed to the right-hand end of the booster valve spool by means of a branch passage 332. Control pressure is distributed to the booster valve chamber through a passage 334 which communicates with control pressure passage 136. When the booster valve spool 316 is in a right-hand position, as viewed in FIGURE 2a, valve land 318 blocks this passage 334. The booster valve above described is illustrated in more particular detail in FIGURE 5a.

Referring next to FIGURE 5a, it will be apparent that the valve spool 316 will assume a downward position whenever the magnitude of the throttle pressure made available by the throttle valve is below a calibrated value. In this instance, passage 314 will freely communicate with passage 330 through the booster valve chamber and the control pressure passage 334 will be blocked. It should be noted that the chamber occupied by spring 322 is open to exhaust by means of an exhaust port 336. However, when the magnitude of the throttle pressure made available by the throttle valve increases beyond a desired value, the throttle pressure force acting on the lower end of the booster valve spool, as shown in FIGURE 5a, will urge the valve spool upwardly, thereby causing the spring to yield. The valve land 318 will then progressively uncover control pressure land 334 and throttle pressure passage 314 will be progressively restricted by valve land 320. It is thus apparent that a regulated control pressure will be made available to passages 330, 328 and 286 and this supplements the throttle pressure which is supplied to the passages 330, 328 and 286 by passage 314. Although the pressure signal which is made available to the shift valves may be referred to as an engine torque output sensitive signal, the pressure signal supplied by the source is amplified, as above indicated. During operation of the vehicle at advanced engine throttle settings the pressure signal source is amplified by the control pressure pumps, but during operation at low engine throttle settings the sole source is the throttle valve, as above explained.

A passage 338 communicates with passage 286 and it extends to the right-hand end of a 3–2 coasting control valve chamber. The 3–2 coasting control valve includes a valve spool 340 with spaced valve lands 342 and 344. The valve spool 340 is urged in a right-hand direction, as seen in FIGURE 2a, by a valve spring 346, the chamber occupied by the valve spring being exhausted as indicated.

A passage 348 communicates with the 3–2 coasting control valve chamber intermediate valve lands 342 and 344 and it extends to the release side of the double acting front brake servo. The pressure transmitted to the front brake servo by passage 348 causes the servo to move toward a brake releasing position.

Passage 350 is also connected to the 3–2 coasting control valve chamber at a location adjacent passage 348, and when the valve spool 340 is in a right-hand position, as shown in FIGURE 2a, valve spool 340 blocks the passage 350. When throttle pressure is available in passage 196, the valve spool 340 is urged in a left-hand direction against the opposing force of spring 346, thereby establishing free communication between passages 348 and 350. This occurs whenever the engine throttle is advanced to an open or partially open position since the 3–2 coasting control valve is calibrated so that it will shift under all driving conditions other than a closed throttle condition.

Passages 348 and 350 are interconnected by a fixed flow restricting orifice 352, and during closed throttle operation the restriction 352 provides the sole means for transferring fluid between passages 348 and 350.

Passage 350 extends to one side of a 3–2 kickdown control valve chamber within which is situated a movable valve spool 354 having spaced valve lands 356 and 358. A precalibrated flow restricting orifice 360 is situated in passage 350 as indicated. A passage 362 communicates with the valve chamber associated with valve spool 354 and valve land 356 controls the degree of communication between passage 350 and passage 362. A spring 364 normally biases valve spool 354 toward an open position. Passage 362 in turn communicates with passage 274 extending to the rear clutch servo and it is connected to a branch passage 366 by means of a one-way check valve 368, said valve permitting one-way fluid flow from passage 362 to passage 366 and inhibiting a reverse flow. Passage 366 in turn communicates with passage 348. The lower end of the valve chamber for the 3–2 kickdown control valve is in communication with passage 348 and the pressure in the passage urges the valve spool 354 in an upward direction, as viewed in FIGURE 2b, against the opposing force of spring 364.

The diameter of valve land 366 is greater than the diameter of valve land 358 and the differential area defined thereby is subjected to governor pressure by reason of the connection of passage 226 to the 3–2 kickdown control valve chamber. The governor pressure therefore tends to urge valve spool 354 toward a passage closing position and it assists the fluid pressure force created by the pressure acting on the lower end of valve land 358. Valve spool 354 is therefore subjected to two separate fluid pressure forces, one force being due to the governor pressure and the other force being created by the pressure differential across orifice 360 when fluid flows from passage 348 to passage 350 and then through orifice 360 to passage 362. Another by-pass orifice 370 is situated between passages 350 and 362, and it is adapted to by-pass the 3–2 kick-down control valve chamber to establish a minimum flow from passage 350 to passage 362 under those extreme driving conditions in which valve spool 354 is in a fully closed position.

A down-shift valve spool is identified by reference character 372 and it includes a pair of valve lands 374 and 376 situated within a down-shift valve opening. The valve spool 372 may be reciprocated by means of a mechanical linkage mechanism shown in part at 378, and this mechanism is under the control of the vehicle operator. As best seen in FIGURE 4, element 378 comprises a crank pivotally mounted at 380 to the stationary valve body, and the other end thereof is mechanically connected at 382 to a push-pull cable 384, as schematically illustrated in FIGURE 4. The other end of the cable may be connected by means of suitable brackets to the forward body panel 386. An accelerator pedal is shown at 388 and it forms a part of the engine carburetor throttle linkage mechanism, another element of this linkage mechanism being shown at 390. The upper end of the push-pull cable 384 may include a plunger 392 which is spring urged in an upward direction and which may be depressed by the vehicle operator when the accelerator 388 is moved downward to an open throttle position. This causes a counterclockwise movement of the lever 378 and the down-shift valve spool 372 is accordingly moved inwardly. If desired a valve spring 393 may be provided as indicated to normally urge the valve spool 372 outwardly.

During normal forward driving operation of the transmission mechanism the down-shift valve spool 372 is positioned so that valve land 376 covers branch passage 394 communicating with control pressure passage 312. A passage 396 communicates with the down-shift valve chamber adjacent valve land 374 and it extends to a branch passage 398 communicating with the manual valve chamber and with the exhaust port associated with the manual valve. When the manual valve is in the N, D², or D¹ positions, passages 396 and 398 are exhausted through the manual valve chamber. Passage 396 also communicates with the 1–2 shift valve chamber at a location below the 1–2 shift valve land 216 thereby normally exhausting the fluid pressure in the chamber occupied by valve spring 218. Another passage 400 communicates with the down-shift valve chamber adjacent passage 396, and when the valve spool 372 is positioned as shown the down-shift valve establishes communication between passages 396 and 400. Passage 400 in turn extends to and communicates with passage 240 which leads to the lower end of the inhibitor valve chamber as previously described. Passage 400 also communicates with the interior of the sleeve insert 278 in the 2–3 shift valve so that during normal forward drive operation passage 400 serves as an exhaust conduit for the throttle pressure modulator valve plug 282 thereby permitting pressure regulation to take place.

If the vehicle operator opens the engine carburetor throttle to its maximum setting, the downshift valve spool 372 is shifted until valve land 376 uncovers passage 394 and valve land 374 covers passage 396. Passage 400 is thereby pressurized with control pressure and this pressure is distributed to the lower end of the inhibitor valve to urge the same in an upward direction as viewed in FIGURE 2b. Control pressure is also distributed through passage 400 to the lower end of the 2–3 shift valve thereby urging valve plug 280 and the shift valve 262 in an upward direction. This same pressure is applied to the lower end of the 1–2 shift valve to assist the valve spring 218.

The manual valve is moved to the L position at normal carburetor throttle settings, and control pressure is distributed through the manual valve from control pressure passage 136 through passages 398 and 396. This control pressure assists the 1–2 shift valve spring 298 in maintaining the 1–2 shift valve spool 210 in an upward or fully down-shifted position. Control pressure is also distributed from passage 396 to passage 400 through passage 400 to the lower end of the 2–3 shift valve is also urged toward an upward or down-shifted position. The existence of the control pressure in the 1–2 shift valve chamber and the 2–3 shift valve chamber disables the transmission controls and inhibits automatic up-shifts from the lowest gear ratio. However, it should be noted that passage 258 is exhausted through the open end of the manual valve since valve land 186 will in this instance be on the right-hand side of the passage 258, and this exhausts the lower end of the rear servo lockout valve chamber. The rear servo lockout valve chamber will be urged in a downward direction during operation in the L range. The inhibitor valve spool 227 assumes an upward position as previously explained, and this allows control pressure to be distributed to passage 236 from pressurized passage 220, the latter communicating with passage 208 through the down-shifted 1–2 shift valve. Control pressure is distributed to passage 208 by the manual valve.

Since passage 236 is pressurized as above pointed out, fluid pressure is distributed to passage 256 through the rear servo lockout valve and this passage 256 communicates with the rear servo, thereby energizing the same. Control pressure is also distributed from passage 256 to the lower end of the 2–3 shift valve through branch passage 402. The 2–3 shift valve is therefore maintained in a down-shifted position and the rear servo is energized to anchor the planetary carrier for the transmission mechanism. The rear brake therefore serves as a reaction member during operation in the L drive range, and since the rear brake is double acting, engine braking may be readily accomplished.

The aforementioned passage 260 also communicates with the rear servo lockout valve and it is pressurized when the rear servo lockout valve spool 248 assumes a down-shifted position as shown in FIGURE 2b. The pressure thus distributed to passage 20 acts on the compensator valve assembly which will now be described.

The pressure regulator mechanism for the circuit herein disclosed includes a compensator valve comprising a multiple land valve spool 404 having four spaced valve lands 406, 408, 410 and 412. Valve spool 404 is positioned within a cooperating compensator valve chamber which is supplied with control pressure from a branch passage 414 communicating with passage 312. The previously described compensator pressure passage 160 includes portions 418 and 420 extending to spaced locations in the compensator valve chamber. Valve land 408 is adapted to control the degree of communication between passages 414 and 418, and the valve land 406 is adapted to control the degree of communication between passage 414 and a cooperating exhaust port in the compensator valve chamber. The valve spool 404 is urged in a right-hand direction as viewed in FIGURE 2a by a compensator valve spring 422 and this valve biasing force tends to uncover passage 414 and to cover the exhaust port thereby causing compensator pressure passage 160 and compensator pressure passage portions 418 and 420 to become pressurized. This pressure acts on a differential area defined by adjacent valve lands 408 and 410, thereby establishing a compensator pressure force on the valve spool 404 which opposes the valve biasing effort of spring 422. It is thus apparent that pressure regulation will take place within the compensator valve mechanism and the passage 160 will be pressurized with a modulated pressure which will hereinafter be referred to as compensator pressure.

The left end of the compensator valve chamber as viewed in FIGURE 2a has situated therein a valve sleeve 424 within which is positioned a governor valve plug 426. The above-mentioned governor pressure passage 302 extends to the left-hand side of the compensator valve chamber and it acts on valve plug 246 to urge the same in a right-hand direction. This pressure force is opposed by a valve spring 428 situated between valve plug 426 and the valve spool 404.

Another governor valve plug 430 is situated at the right-hand end of the compensator valve chamber and it is movably disposed within the cooperating bore. Valve plug 430 includes a valve land 432 and a valve land 434, the diameter of the former being greater than the diameter of the latter. Control pressure is distributed to the differential area defined by valve lands 432 and 434, a branch passage 436 communicating with passage 312 communicating with the bore for valve plug 430 for this purpose. Governor pressure is also distributed to the right-hand end of the vlave plug 430 through a branch passage 438 that communicates with governor pressure passage 302.

The compensator valve spool 404 is also subjected to transmission throttle pressure and this throttle pressure is distributed to the compensator valve chamber through the aforementioned throttle pressure passage 314 at a location adjacent valve lands 410 and 412. This throttle pressure acts on the differential area defined by valve lands 410 and 412 to urge the compensator valve spool 404 in a left-hand direction to assist the valve biasing effort of the compensator pressure acting on the differential areas defined by valve lands 408 and 410.

Compensator pressure is distributed through passage 160 to the lower end of each of the regulator valves 132 and 166. If the engine carburetor throttle setting is increased, this results in an increase in throttle pressure in passage 314 as previously indicated and the compensator valve spool 404 will then be urged in a left-hand direction with a greater fluid pressure force. This has a tendency to reduce the regulated compensator pressure in passage 160 and this results in a decrease in the compensator pressure force acting on the regulator valves. This results in an increase in line pressure. On the other hand, if the throttle pressure in passage 314 is decreased upon a clearance in engine throttle carburetor opening, the regulating characteristics of the compensator valve are altered so that the compensator pressure in passage 160 is increased. This increased compensator pressure acting on the regulator valve results in a decrease in the control pressure made available to the circuit. The torque transmitting capacities of the pressure operated servos of the transmission will then be varied in accordance with the engine torque.

If the vehicle speed increases for any given engine carburetor throttle valve setting, the governor pressure force acting on the governor pressure plug 426 will increase and this force in turn is transmitted to the compensator valve spool 404 through spring 422. This tends to increase the degree of communication between passages 414 and 160 and the resulting change in the regulating characteristics of the compensator valve produces an increase in the compensator pressure. As previously explained this increase in compensator pressure results in a decrease in the control pressure made available by the pressure regulator valves.

If the vehicle speed continues to increase to a relatively high value, the compensator pressure in passage 160 would normally tend to increase. However, it is undesirable to allow the compensator pressure to increase beyond a value which will result in slippage of the torque transmitting elements of the pressure operated servos due to a corresponding reduction in control pressure. To overcome this undesirable condition the governor valve plug 430 is calibrated so that when the vehicle speed increases to a limiting value for any given control pressure, the governor plug 430 will be shifted in a left-hand direction against the control pressure acting on the differential area defined by valve lands 432 and 434. The governor pressure force acting on valve land 432 will therefore be transmitted directly to valve land 434 and this force opposes and cancels the governor pressure force acting on the governor valve plug 426. The compensator valve mechanism is thereafter insensitive to changes in vehicle speed.

When the transmission is conditioned for reverse operation or for operation in the L drive range, passage 258 is exhausted as previously explained. The passage 260 therefore becomes pressurized since the rear servo lockout valve is shifted in a downward direction as viewed in FIGURE 2b. The pressure thus distributed to passage 260 acts on the right-hand end of the compensator valve spool 404 to supplement the biasing action of the throttle valve pressure. This results in a substantial decrease in compensator pressure and a corresponding substantial increase in control pressure. The capacities of the fluid pressure operated transmission servos are therefore increased so that the increased torque delivery requirements of the transmission clutches and brakes will be satisfied.

Referring next to FIGURE 3, the throttle valve and the mechanism for actuating the same is shown in more particular detail. This actuating mechanism comprises an enclosure 440 which may be cylindrical in shape as indicated in FIGURE 3. One end thereof is enclosed by a wall 442 to which is connected a conduit fitting 444. Conduit fitting 444 may be fixed within a cooperating aperture in wall 442 by welding, by brazing or by other suitable means. A suitable conduit may then extend from fitting 444 to the engine intake manifold of the engine so that the interior of the enclosurse 440 will be pressurized with engine intake manifold pressure.

One end of the enclosure 440 is enclosed by a flexible diaphragm 446 which may extend over the edge of the enclosure 440 and which may be held in place by a suitable crimped plate 448. Diaphragm back-up washers 450 and 452 may be connected to opposed sides of the diaphragm 446 and they may be secured in place by means of a centrally disposed adaptor 454. The adaptor 454 extends through a central aperture in the diaphragm 446 and in the washers 450 and 452, and the terminal part of the extension for adaptor 454 is turned over the adjacent inner margin of the washer 452, thereby clamping the diaphragm assembly to the body of the adaptor 454. A spring 456 is disposed within the enclosure 440 and it acts against the diaphragm assembly to urge the same in a left-hand direction as viewed in FIGURE 3.

Plate 448 carries a threaded mounting adaptor 458 which may be threadably received within a cooperating opening which is formed in a portion 460 of the rearward wall structure of the transmission housing.

Adaptor 458 is formed within a cylinder opening through which a transmission throttle valve actuator rod 462 extends. The rod 462 forms a mechanical connection between the diaphragm assembly and the throttle valve spool 304. The plate 448 is fixed to the adaptor 458 and the enclosure 440 is supported in the exterior of the transmission housing in this fashion. The adaptor 458 extends through a central opening formed in plate 448 and the terminal part thereof is deformed so that it overlies the periphery of the central opening.

Referring next to FIGURE 5b, I have illustrated a modified form of the throttle booster valve, and it comprises a single valve spool 464 having a pair of valve lands 466 and 468 of dissimilar diameters. A valve spring 470 biases the valve spool 464 in a downward direction within the booster valve chamber, the latter being formed with internal valve lands which cooperate with the aforementioned valves land 466 and 468.

Throttle pressure is admitted to the lower end of the booster valve chamber through a passage identified by reference character 314′. This passage 314′ forms a counterpart for the above-described throttle pressure passage 314. The throttle booster valve chamber may be grooved, as shown at 472, to allow throttle pressure to be admitted to the lower end of the throttle booster valve chamber where its acts on the relatively large diameter valve land 468. Control pressure is distributed to the throttle booster valve chamber through a passage identified by reference character 334'. This passage 334' corresponds to the aforementioned control pressure passage 334 described with reference to the embodiment of FIGURE 5a.

The upper end of the throttle booster valve chamber shown in FIGURE 5b is exhausted through an exhaust port shown at 336'.

During operation of the valve of the embodiment of FIGURE 5b, throttle pressure is normally distributed directly from throttle pressure passage 314' to an outlet passage 328' which in turn extends to a transmission shift valve mechanism. The passage 328' forms a counterpart for the above-described passage 328 when the angle is operated at relatively reduced carburetor throttle settings. The pressure in passage 328' is the same in magnitude as the throttle pressure made available to throttle pressure passage 314. However, at more advanced engine carburetor throttle settings the valve spool 464 will be urged in an upward direction, thereby causing valve land 468 to restrict passage 314' and to simultaneously cause valve land 466 to uncover control pressure passage 334'. The pressure signal in outlet passage 328' is thereby supplemented by line pressure whenever the transmission throttle pressure exceeds the calibrated limiting value.

In order to very briefly describe the function of certain principal elements of the control circuit heretofore described, an operating shift sequence will be outlined. For purposes of discussion it will be assumed that the manual valve is in the D¹ position and that the vehicle is initially at rest with the engine idling. Under such conditions the engine manifold pressure is at a minimum value and the diaphragm assembly of the throttle valve actuator mechanism shown in FIGURE 3 will therefore be urged under the influence of atmospheric pressure in a right-hand direction against the force of spring 456. The throttle valve spool 304 will in this instance be urged in a left-hand drection as viewed in FIGURE 2a, and the throttle pressure existing in passage 314 will therefore be substantially zero in magnitude. The 1–2 shift valve will assume an upward position as shown in FIGURE 2b and control pressure will then be distributed through passage 208, through the 1–2 shift valve, through passage 229, through the inhibitor valve, which in this instance is in an upward position, as viewed in FIGURE 2b, to the lower end of transition valve. The real servo lockout valve will assume an upward position as previously explained. Control pressure is distributed directly to the front clutch through passages 192 and 194. Transfer of fluid pressure to the rear servo is blocked by the rear servo lockout valve, and the rear servo is exhausted through the exhaust port in the rear servo lockout valve. The rear clutch is exhausted through passage 274, through the 2–3 shift valve, through passage 272 and throug the exhaust port in the manual valve. The apply side of the front servo is exhausted through passage 206 and through the exhaust port in the transition valve. The release side of the front servo is exhausted through passage 348, passage 350, passage 362, passage 374, the 2–3 shift valve, passage 272 and the exhaust port of the manual valve.

Since the front clutch is the only servo which is energized, the transmission will move forward in the low speed drive range as previously explained, the overrunning brake 116 providing the necessary torque reaction of the planetary carrier. When the engine carburetor throttle for the vehicle is moved in an intemediate setting, a corresponding increase in engine intake manifold pressure takes place and this causes the throttle valve actuator mechanism to urge throttle valve spool 304 in a right-hand direction as viewed in FIGURE 2a. This results in an increase in throttle pressure in passage 314. This throttle pressure is distributed through the throttle booster valve and through passage 286, which in turn communicates with the throttle modulator valve plug 282. The modulated throttle pressure produced by the valve plug 282 acts on the lower ends of each of the shift valves tending to maintain each of these valves in a downshift position.

If it is assumed that the vehicle engine accelerates at a given carburetor throttle setting, the governor pressure in passage 226 will progressively increase in magnitude and the resulting upshifting tendencies produced by the governor pressure acting on the 1–2 shift valve and 2–3 shift valve will progressively increase. When 1–2 shift point is reached for any given throttle setting, the 1–2 shift valve will move in a downward direction, as viewed in FIGURE 2b, and this open passage 220 to the exhaust port in the 1–2 shift valve. The control pressure acting on the upper side of the transistion valve land 246 is also exhausted in this fashion and the transition valve therefore moves in an upward direction as viewed in FIGURE 2b, thus causing control pressure to be transferred from passage 200 to the passage 206 extending to the apply side of the front servo. Since the brake band 64 and the front clutch are simultaneously applied to the transmission is conditioned for second gear operation.

Upon a further increase in vehicle speed for a given throttle setting, the magnitude of the governor pressure will cause the 2–3 shift valve to move downwardly to an upshift position and this establishes communication between passage 270 and passage 274, thereby causing the rear clutch to be pressurized.

Passage 270 communicates with passage 258 which in turn extends to the manual valve. When passage 274 is pressurized in this fashion, control pressure is distributed to passage 362 and through the one-way check valve 368 to passage 348, the latter extending to the release side of the front servo. Since both sides of the front servo are pressurized, the front band is released and the transmission mechanism is thus conditioned for operation in the third gear ratio.

If the vehicle operator suddenly opens the carburetor throttle, the transmission throttle valve pressure increases, and if this increase is of a sufficient magnitude, the 2–3 shift valve will be moved upwardly to a downshift position thereby causing the rear clutch to be exhausted through passage 274, through the 2–3 shift valve, through passage 272 and through the exhaust port in the manual valve. Also, the release side of the front servo will be exhausted through passage 348, passage 350, through the annular opening controlled valve land 356 of the 3–2 kickdown valve, through passage 362, through passage 374, through the 2–3 shift valve and through passage 272 extending to the manual valve.

The foregoing description describes the mode of operation of the valve system during a so-called torque delivery 2–3 upshift. If a 2–3 upshift occurs under zero or minimum throttle conditions, however, throttle pressure will be introduced to passage 341 by reason of the fact that the inhibitor valve will have assumed a downward position. This occurs immediately following the movement of the 1–2 shift valve to the upshift position. Throttle pressure then is distributed from passage 339 to passage 341 and hence to the lower end of the land 246 of the 1–2 transition and 2–3 backout valve 202. The valve cavity on the upper end of land 246, of course, is exhausted. It therefore is apparent that upon movement of the 2–3 shift valve to the upshift position, pressure is distributed initially from pressurized passage 270 to passage 274 which in turn communicates with the rear clutch servo. Passage 274, prior to movement of the 2–3 shift valve, was exhausted through passage 272 and the port 398 in the manual valve.

The pressure in passage 274 is distributed to passage 263 and acts upon the upper end of valve land 204 of the 1-2 transition and 2-3 backout valve. When the pressure in the rear clutch servo in passage 274 reaches a value that is sufficient to overcome the force of spring 247, the valve 202 will shift downwardly thereby connecting passage 206 to exhaust port 345. This exhausts the brake apply chamber of the intermediate brake servo. The intermediate brake servo thus immediately becomes released as it loses capacity.

The valve 202 and the spring 247 can be calibrated so that the intermediate brake servo will lose capacity at the instant the rear clutch servo reaches its balance point. That is, it will shift as soon as the pressure in passage 274 is sufficient to overcome the return spring force of the clutch apply piston.

If the 2-3 upshift occurs at a throttle setting that is greater than zero, the pressure in passage 341 will increase accordingly. Thus, the valve 202 will become shifted only after the pressure in passage 274 reaches an increased value. The release of the intermediate speed brake thus is delayed accordingly so that a very small amount of overlap in the release of the brake and the application of the clutch is achieved. But the degree of overlap is only that which is sufficient to maintain smooth shift quality with the reduced torque that is being delivered.

Figure 6:
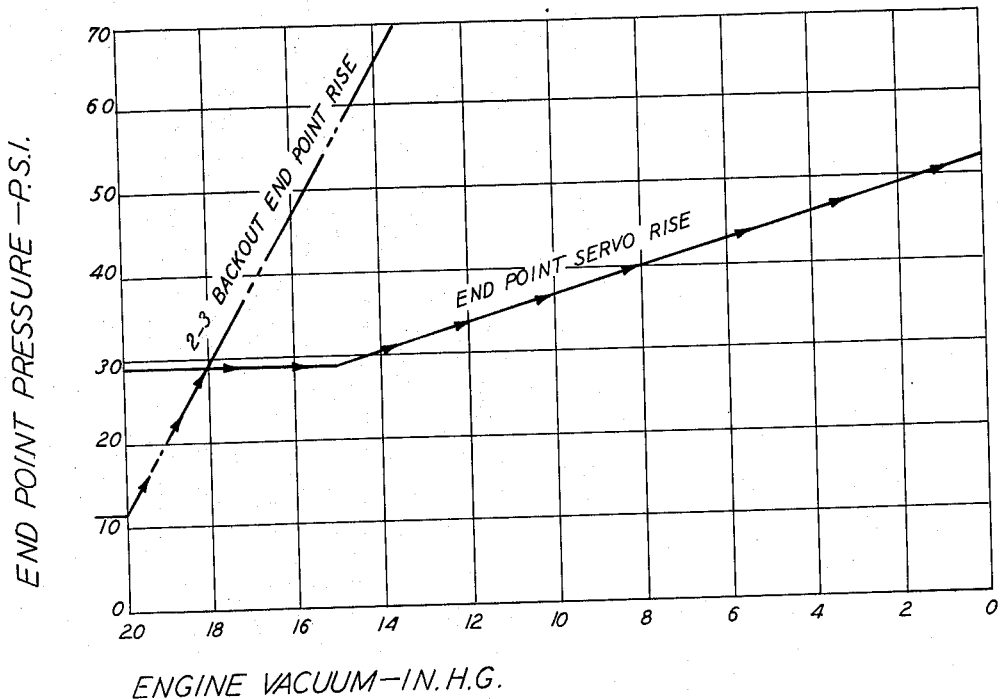
FIGURE 6 shows a chart that illustrates the variations in the end points of the backout valve.

Referring next to FIGURE 6, I have illustrated the variation in the balance points or end points for the backout valve 202 as well as the corresponding balance point or end point for the intermediate speed brake servo. It will be apparent that for any engine throttle setting that will result in an engine intake manifold vacuum greater than 20 inches of mercury, the point at which the valve 202 will be shifted is determined only by the calibration of the spring 247. The end point remains constant. At 20 inches of vacuum, however, the throttle valve system begins to develop a torque sensitive pressure signal that is distributed to the passage 341 by the inhibitor valve. This throttle pressure, as explained previously, augments the action of the spring 247 and causes a rise in the value of the end point for the valve 202. At approximately 18 inches of vacuum, the end point for the valve 202 is the same as the corresponding end point for the servo itself. Thus, the 2-3 upshift is determined by the calibration of the servo whenever the engine vacuum is less than 18 inches of mercury. The valve system thus functions in the usual fashion to provide a torque delivery upshift, and the transition point between servo release and clutch apply is not determined by the calibration of the valve 202.

The 3-2 coasting control valve is shifted in a left-hand direction under these conditions since the passage 358 is subjected to throttle pressure and passage 348 therefore communicates with passage 350 through the 3-2 coasting control valve chamber. The 3-2 kickdown valve provides a controlled degree of restriction in the exhaust flow path for the release side of the front servo. As previously indicated, the degree of restriction provided by the 3-2 control valve is determined by the pressure drop across the orifice 360 and also by the magnitude of the governor pressure acting on the 3-2 kickdown control valve spool. The application of the front band will therefore be delayed somewhat following the initial disengagement of the rear clutch, and this delay is sufficient to permit the engine to accelerate to the higher speed which is necessary for operation in the downshift ratio.

If the vehicle is coasted in high gear with a closed engine throttle, the 3-2 coasting control valve will assume the position shown in FIGURE 2a. When the vehicle decelerates to the required degree, the 2-3 shift valve will then move from the high speed upshift position to the low speed downshift position. The rear clutch and the release side of the front servo will then be exhausted through the fluid flow path previously described with reference to a forced downshift. However, since the 3-2 coasting control valve is in the position shown in FIGURE 2a, the only communication between passages 348 and 350 is that which is established by flow restriction 352, and the rate of engagement of the front band will therefore be substantially delayed and the engagement itself will be cushioned. This avoids an undesirably rough downshift.

If the manual valve is shifted to the $D^2$ position, passage 208 is exhausted through an exhaust port manual valve. Control pressure is therefore made unavailable to the 1-2 shift valve since the passage 208 is likewise exhausted. Since this is the case, the lower end of the transition valve will be continuously exhausted and control pressure will thus be made available to passage 206 regardless of the vehicle speed or carburetor throttle setting. The front servo is therefore applied and the transmission will therefore not be allowed to downshift into the first gear ratio.

Having thus described a preferred embodiment of my invention, what I claim and desire to secure by U.S. Letters Patent is:

1. In a power transmission mechanism adapted to deliver driving torque from an engine to a driven member, a gear system having relatively movable elements, one element of said gear system being connected to a driven member, means for coupling power input elements of said gear system to said engine, reaction brake means including a fluid pressure operated brake servo for anchoring a first reaction element of said gear system to accommodate driving torque reaction and condition said mechanism for first underdrive speed ratio operation, clutch means including a fluid pressure operated servo for connecting together two elements of said gear system to condition said mechanism for high speed ratio operation, said brake servo including a pressure movable brake applying member defining in part brake apply and release pressure chambers on opposed sides thereof, a fluid pressure source, conduit structure connecting said source with said clutch servo and each pressure chamber of said brake servo with a common portion thereof communicating with said apply pressure chamber and said clutch servo, a source of a pressure signal that is sensitive to changes in engine torque, shift valve means disposed in and defining in part said conduit structure for selectively distributing pressure to said common portion to establish speed ratio changes, distributor valve means communicating with said common portion and responsive to a pressure build-up therein for connecting said servo apply chamber to a low pressure region of said conduit structure during a shift interval, and a fluid connection between said pressure signal source and said distributor valve means thereby establishing a pressure signal force that opposes the influence on said distributor valve means of said pressure build-up, a second fluid pressure operated brake means for anchoring a second reaction element to obtain operation in another underdrive ratio, second shift valve means in communication with said fluid pressure source for controlling distribution of pressure to said second brake means, an auxiliary valve area on said distributor valve means, and passage means for connecting hydraulically said auxiliary area and said second brake means whereby the influence of said signal force on said distributor valve means is opposed.

2. In a control system for a power transmission mechanism having at least three forward driving speed ratios, said mechanism being adapted to deliver driving torque from an engine to a driven member, a gear system with gear elements defining plural torque delivery paths between said engine and said driven member, said driven member being connected to a power output element of said gear system, means for coupling said engine to a first power input element of said system, reaction brake means including a fluid pressure operated brake servo for anchoring an element of said gear system to accommodate driving torque and condition said mechanism for intermediate speed ratio operation, clutch means including a fluid pressure operated servo for coupling selectively said engine to a second power input element of said system during operation in a high speed ratio, second fluid pressure operated reaction brake means for anchoring an element of said gear system to accommodate driving torque reaction and for conditioning said mechanism for operation in a low speed ratio, said brake servo including a pressure movable brake applying member defining in part brake apply and release pressure chambers on opposed sides thereof, a fluid pressure source, conduit structure connecting said source with said clutch servo and each pressure chamber of said brake servo with a common portion thereof communicating with said apply pressure chamber and said clutch servo, a source of a pressure load signal that is sensitive to changes in engine torque, first shift valve means and second shift valve means disposed in and partly defining said conduit structure for conditioning said valve system for pressure distribution to said servo apply chamber and for distributing pressure to said common portion, respectively, to establish sequentially two speed ratio changes, distributor valve means communicating with said common portion and responsive to the pressure build-up therein for connecting said servo apply chamber to a low pressure region of said conduit structure during the interval of a shift from said intermediate speed ratio to said high speed ratio, a fluid connection between said pressure signal source and said distributor valve means thereby establishing a pressure signal force that opposes the influence on said distributor valve means of said pressure build-up, an auxiliary valve area on said distributor valve means, and branch passage means for distributing pressure from said second brake means to said auxiliary area when the former is pressurized thereby establishing a force that opposes the influence of said load signal on said distributor valve means.

3. In a power transmission mechanism adapted to deliver driving torque from an engine to a driven member, said engine having an air-fuel mixture intake manifold, a gear system having multiple gear elements that define plural torque delivery paths between said engine and said driven member, one element of said gear system being connected to a driven member, means for coupling power input elements of said gear system to said engine, reaction brake means including a fluid pressure operated brake servo for anchoring a first reaction element of said gear system to accommodate driving torque reaction during operation of said mechanism in a first underdrive speed ratio, clutch means including a fluid pressure operated servo for connecting together two elements of said gear system to condition said mechanism for high speed ratio operation, said brake servo including a pressure movable brake applying member defining in part brake apply and release pressure chambers on opposed sides thereof, a fluid pressure source, conduit structure connecting said source with said clutch servo and each pressure chamber of said brake servo with a common portion thereof being connected to said apply pressure chamber and said clutch servo, a load signal pressure source including engine manifold pressure operated valve means for establishing a pressure signal that is proportional in magnitude to manifold pressure, shift valve means disposed in and defining in part said conduit structure for selectively distributing pressure to said common portion to establish speed ratio changes, distributor valve means communicating with said common portion and responsive to a pressure build-up therein for connecting said servo apply chamber to a low pressure region of said conduit structure during the interval of a shift, said manifold pressure operated valve means communicating with said shift valve means whereby the latter is subjected to said pressure signal, a fluid connection between said pressure signal source and said distributor valve means thereby establishing a pressure signal force that opposes the influence on said distributor valve means of said pressure build-up, a second fluid pressure operated brake means for anchoring a second reaction element to obtain operation in another underdrive ratio, second shift valve means in communication with said fluid pressure source for controlling distribution of pressure to said second brake means, an auxiliary valve area on said distributor valve means, and passage means for connecting hydraulically said auxiliary area and said second brake means whereby the influence of said signal force on said distributor valve means is opposed.

4. In a control system for a power transmission mechanism having at least three forward driving speed ratios, said mechanism being adapted to deliver driving torque to a driven member, an engine having an air-fuel mixture intake manifold, a gear system with gear elements defining plural torque delivery paths between said engine and said driven member, said driven member being connected to a power output element of said gear system, means for coupling said engine to a first power input element of said gear system, first reaction brake means including a fluid pressure operated brake servo for anchoring an element of said gear system to accommodate driving torque reaction and condition said mechanism for intermediate speed ratio operation, clutch means including a fluid pressure operated servo for coupling said engine to another power input element of said gear system to condition said mechanism for high speed ratio operation, said brake servo including a pressure movable brake applying member defining in part brake apply and release pressure chambers on opposed sides thereof, a second fluid pressure operated reaction brake means for anchoring an element of said gear system when said fluid pressure operated clutch means is released and said brake servo is released for conditioning the mechanism for low speed ratio operation, a fluid pressure source, conduit structure connecting said source with said clutch servo and each pressure chamber of said brake servo and having a common portion thereof communicating with said apply pressure chamber and said clutch servo, a source of a pressure load signal that is proportional in magnitude to engine manifold pressure, first shift valve means and second shift valve means disposed in and partly defining said conduit structure for conditioning said valve system for pressure distribution to said servo apply chamber and for distributing pressure to said common portion respectively to establish sequentially two speed ratio changes, each shift valve means being in fluid communication with said pressure signal source whereby a shift controlling force is applied thereto, distributor valve means communicating with said common portion in response to a pressure build-up therein for connecting said servo apply chamber to a low pressure region of said conduit structure during a shift from said intermediate speed ratio to said high speed ratio when said manifold pressure is low, a fluid connection between said pressure signal source and said distributor valve means thereby establishing a pressure signal force that opposes the influence on said distributor valve means of said pressure build-up during a speed ratio shift from said intermediate speed ratio to said high speed ratio at increased values of manifold pressure, an auxiliary area formed on said distributor valve means, and a branch passage means for connecting said second brake means to said auxiliary area thereby establishing a pressure force that opposes the influence of said signal force on said distributor valve means.

5. In a control system for a power transmission mechanism having at least three forward driving speed ratios, said mechanism being adapted to deliver driving torque from an engine to a driven member, a gear system with gear elements defining plural torque delivery paths between said engine and said driven member, said driven member being connected to a power output element of said gear system, means for coupling said engine to a first power input element of said system, reaction brake means including a fluid pressure operated brake servo for anchoring an element of said gear system to accommodate driving torque and condition said mechanism for intermediate speed ratio operation, clutch means including a fluid pressure operated servo for coupling selectively said engine to a second power input element of said system during operation in a high speed ratio, second reaction brake means for anchoring an element of said gear system to accommodate driving torque reaction and for conditioning said mechanism for operation in a low speed ratio, said brake servo including a pressure movable brake applying member defining in part brake apply and release pressure chambers on opposed sides thereof, a fluid pressure source, conduit structure connecting said source with said clutch servo and each pressure chamber of said brake servo with a common portion thereof communicating with said apply pressure chamber and said clutch servo, a source of a pressure load signal that is sensitive to changes in engine torque, first shift valve means and second shift valve means disposed in and partly defining said conduit structure for conditioning said valve system for pressure distribution to said servo apply chamber and for distributing pressure to said common portion, respectively, to establish sequentially two speed ratio changes, distributor valve means communicating with said common portion and responsive to the pressure build-up therein for connecting said servo apply chamber to a low pressure region of said conduit structure during the interval of a shift from said intermediate speed ratio to said high speed ratio, and a fluid connection between said pressure signal source and said distributor valve means thereby establishing a pressure signal force that opposes the influence on said distributor valve means of said pressure build-up, said second reaction brake means including a second fluid pressure operated brake servo, a hydraulic connection defined in part by said second shift valve means between said pressure source and said second brake servo, inhibitor valve means for establishing and interrupting said hydraulic connection, a source of a speed pressure signal proportional in magnitude to the driven speed of said driven member, a passage connecting said speed signal source and said inhibitor valve means to urge the latter to a blocking position at speeds greater than a predetermined value, said inhibitor valve means defining also in part a hydraulic connection between said distributor valve means and said load signal source whereby said inhibitor valve means is adapted to distribute pressure to said distributor valve means when it assumes a blocking position and to interrupt such distribution at speeds less than said predetermined value.

6. In a power transmission mechanism adapted to deliver driving torque from an engine to a driven member, said engine having an air-fuel mixture intake manifold, a gear system having multiple gear elements that define plural torque delivery paths between said engine and said driven member, one element of said gear system being connected to a driven member, means for coupling power input elements of said gear system to said engine, reaction brake means including a fluid pressure operated brake servo for anchoring an element of said gear system to accommodate driving torque reaction during operation of said mechanism in a reduced speed ratio, clutch means including a fluid pressure operated servo for connecting together two elements of said gear system to condition said mechanism for high speed ratio operation, said brake servo including a pressure movable brake applying member defining in part brake apply and release pressure chambers on opposed sides thereof, a fluid pressure source, conduit structure connecting said source with said clutch servo and each pressure chamber of said brake servo with a common portion thereof being connected to said apply pressure chamber and said clutch servo, a load signal pressure source including engine manifold pressure operated valve means for establishing a pressure signal that is proportional in magnitude to manifold pressure, shift valve means disposed in and defining in part said conduit structure for selectively distributing pressure to said common portion to establish speed ratio changes, distributor valve means communicating with said common portion and responsive to a pressure build-up therein for connecting said servo apply chamber to a low pressure region of said conduit structure during the interval of a shift, said manifold pressure operated valve means communicating with said shift valve means whereby the latter is subjected to said pressure signal, and a fluid connection between said pressure signal source and said distributor valve means thereby establishing a pressure signal force that opposes the influence on said distributor valve means of said pressure build-up, second reaction brake means for anchoring another element of said gear system to accommodate driving torque reaction during operation of said mechanism in another reduced speed ratio, said shift valve means defining in part said conduit structure for controlling the operation of said second reaction brake means, said second reaction brake means including a second fluid pressure operated brake servo, a hydraulic connection defined in part by said second shift valve means between said pressure source and said second brake servo, inhibitor valve means for establishing and interrupting said hydraulic connection, a source of a speed pressure signal proportional in magnitude to the driven speed of said driven member, a passage connecting said speed signal source and said inhibitor valve means to urge the latter to a blocking position at speeds greater than a predetermined value, said inhibitor valve means defining also in part a hydraulic connection between said distributor valve means and said load signal source whereby said inhibitor valve means is adapted to distribute pressure to said distributor valve means when it assumes a blocking position and to interrupt such distribution at speeds less than said predetermined value.

7. In a control system for a power transmission mechanism having at least three forward driving speed ratios, said mechanism being adapted to deliver driving torque to a driven member, an engine having an air-fuel mixture intake manifold, a gear system with gear elements defining plural torque delivery paths between said engine and said driven member, said driven member being connected to a power output element of said gear system, means for coupling said engine to a first power input element of said gear system, first reaction brake means including a fluid pressure operated brake servo for anchoring an element of said gear system to accommodate driving torque reaction and condition said mechanism for intermediate speed ratio operation, clutch means including a fluid pressure operated servo for coupling said engine to another power input element of said gear system to condition said mechanism for high speed ratio operation, said brake servo including a pressure movable brake applying member defining in part brake apply and release pressure chambers on opposed sides thereof, a second reaction brake means for anchoring an element of said gear system when said fluid pressure operated clutch means is released and said brake servo is released for conditioning the mechanism for low speed ratio operation, a fluid pressure source, conduit structure connecting said source with said clutch servo and each pressure chamber of said brake servo and having a common portion thereof communicating with said apply pressure chamber and said clutch servo, a source of a pressure load signal that is proportional in magnitude to engine manifold pressure, first shift valve means and second shift valve means disposed in and partly defining said conduit structure for conditioning said valve system for pressure distribution to said servo apply chamber and for distributing pressure to said common portion respectively to establish sequentially two speed ratio changes, each shift valve means being in fluid communication with said pressure signal source whereby a shift controlling force is applied thereto, distributor valve means communicating with said common portion in response to a pressure build-up therein for connecting said servo apply chamber to a low pressure region of said conduit structure during a shift from said intermediate speed ratio to said high speed ratio when said manifold pressure is low, and a fluid connection between said pressure signal source and said distributor valve means thereby establishing a pressure signal force that opposes the influence on said distributor valve means of said pressure build-up during a speed ratio shift from said intermediate speed ratio to said high speed ratio at increased values of manifold pressure, said second reaction brake means including a second fluid pressure operated brake servo, a hydraulic connection defined in part by said second shift valve means between said pressure source and said second brake servo, inhibitor valve means for establishing and interrupting said hydraulic connection, a source of a speed pressure signal proportional in magnitude to the driven speed of said driven member, a passage connecting said speed signal source and said inhibitor valve means to urge the latter to a blocking position at speeds greater than a predetermined value, said inhibitor valve means defining also in part a hydraulic connection between said distributor valve means and said load signal source whereby said inhibitor valve means is adapted to distribute pressure to said distributor valve means when it assumes a blocking position and to interrupt such distribution at speeds less than said predetermined value.

8. In a control system for a power transmission mechanism having at least three forward driving speed ratios, said mechanism being adapted to deliver driving torque from an engine to a driven member, a gear system with gear elements defining plural torque delivery paths between said engine and said driven member, said driven member being connected to a power output element of said gear system, means for coupling said engine to a first power input element of said system, reaction brake means including a fluid pressure operated brake servo for anchoring an element of said gear system to accommodate driving torque and condition said mechanism for intermediate speed ratio operation, clutch means including a fluid pressure operated servo for coupling selectively said engine to a second power input element of said system during operation in a high speed ratio, second fluid pressure operated reaction brake means for anchoring an element of said gear system to accommodate driving torque reaction and for conditioning said mechanism for operation in a low speed ratio, said brake servo including a pressure movable brake applying member defining in part brake apply and release pressure chambers on opposed sides thereof, a fluid pressure source, conduit structure connecting said source with said clutch servo and each pressure chamber of said brake servo with a common portion thereof communicating with said apply pressure chamber and said clutch servo, a source of a pressure load signal that is sensitive to changes in engine torque, first shift valve means and second shift valve means disposed in and partly defining said conduit structure for conditioning said valve system for pressure distribution to said servo apply chamber and for distributing pressure to said common portion, respectively to establish sequentially two speed ratio changes, distributor valve means communicating with said common portion and responsive to the pressure build-up therein for connecting said servo apply chamber to a low pressure region of said conduit structure during the interval of a shift from said intermediate speed ratio to said high speed ratio, and a fluid connection between said pressure signal source said distributor valve means thereby establishing a pressure signal force that opposes the influence on said distributor valve means of said pressure build-up, distributor valve means forming in part a fluid connection between said source and said pressure apply chamber and a hydraulic connection between said first shift valve means and said distributor valve means whereby the former distributes valve actuating pressure to the latter upon a speed ratio change from a low speed ratio to an intermediate speed ratio thereby actuating said distributor valve means to interrupt pressure distribution to said pressure apply chamber during low speed ratio operation and establishing such pressure distribution during intermediate speed ratio operation.

9. In a power transmission mechanism adapted to deliver driving torque from an engine to a driven member, said engine having an airfuel mixture intake manifold, a gear system having multiple gear elements that define plural torque delivery paths between said engine and said driven member, one element of said gear system being connected to a driven member, means for coupling power input elements of said gear system to said engine, reaction brake means including a fluid pressure operated brake servo for anchoring an element of said gear system to accommodate driving torque reaction during operation of said mechanism in a reduced speed ratio, clutch means including a fluid pressure operated servo for connecting together two elements of said gear system to condition said mechanism for high speed ratio operation, said brake servo including a pressure movable brake applying member defining in part brake apply and release pressure chambers on opposed sides thereof, a fluid pressure source, conduit structure connecting said source with said clutch servo and each pressure chamber of said brake servo with a common portion thereof being connected to said apply pressure chamber and said clutch servo, a load signal pressure source including engine manifold pressure operated valve means for establishing a pressure signal that is proportional in magnitude to manifold pressure, shift valve means disposed in and defining in part said conduit structure for selectively distributing pressure to said common portion to establish speed ratio changes, distributor valve means communicating with said common portion and responsive to a pressure build-up therein for connecting said servo apply chamber to a low pressure region of said conduit structure during the interval of a shift, said manifold pressure operated valve means communicating with said shift valve means whereby the latter is subjected to said pressure signal, and a fluid connection between said pressure signal source said distributor valve means thereby establishing a pressure signal force that opposes the influence on said distributor valve means of said pressure build-up, said distributor valve means forming in part a fluid connection between said source and said pressure apply chamber and a hydraulic connection between said first shift valve means and said distributor valve means whereby the former distributes valve actuating pressure to the latter upon a speed ratio change from a low speed ratio to an intermediate speed ratio thereby actuating said distributor valve means to interrupt pressure distribution to said pressure apply chamber during low speed ratio operation and establishing such pressure distribution during intermediate speed ratio operation.

References Cited by the Examiner

UNITED STATES PATENTS 2,792,716  5/1957  Christenson _____ 74—472
3,095,755  7/1963  Duffy _____ 74—472

DAVID J. WILLIAMOWSKY, *Primary Examiner.*

DON A. WAITE, *Examiner.*

J. R. BENEFIEL, *Assistant Examiner.*